Figures 1, 2:
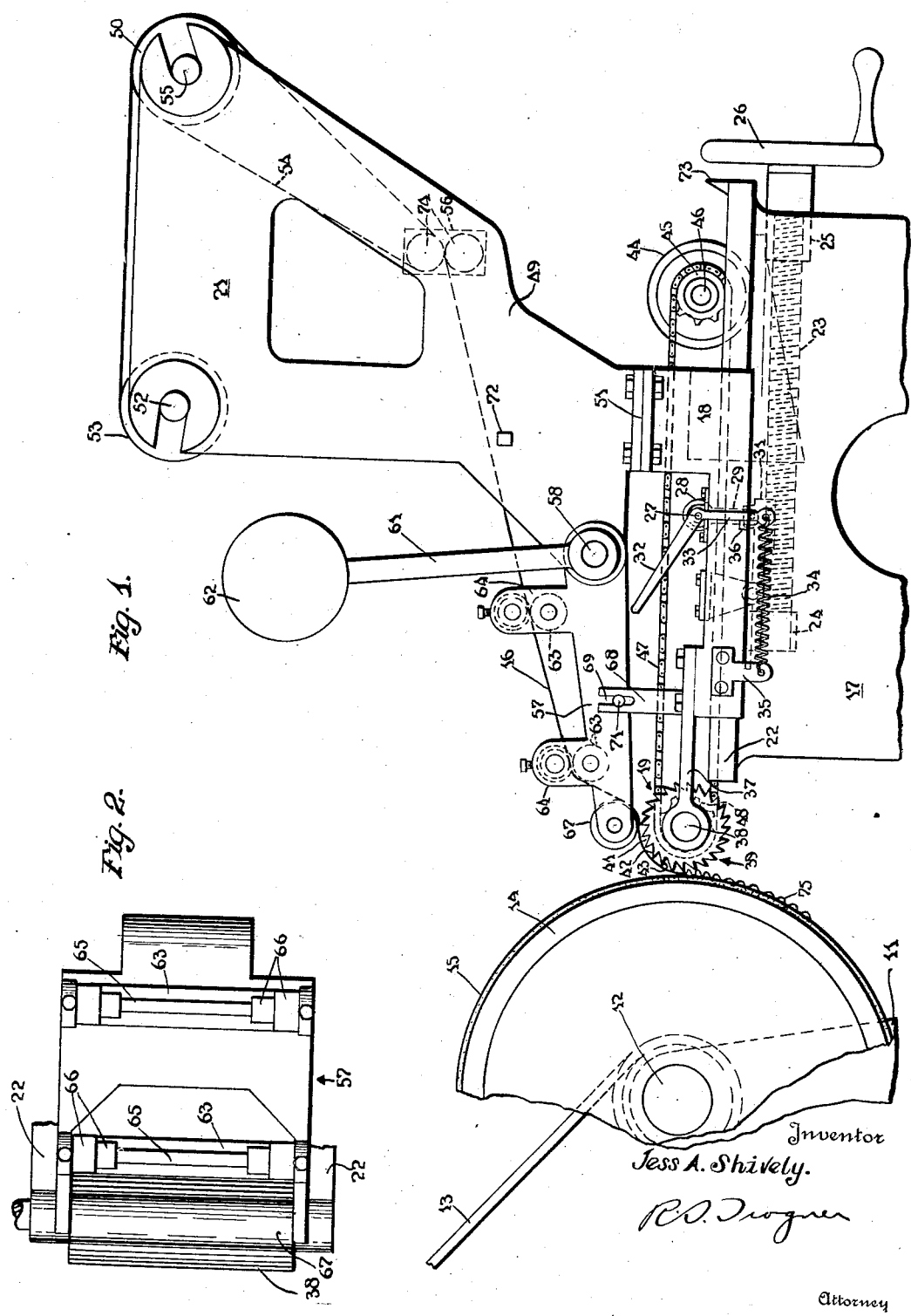

Oct. 21, 1930.  J. A. SHIVELY  1,779,399
TIRE BUILDING APPARATUS
Filed Dec. 14, 1927

Inventor
Jess A. Shively.

Attorney

Patented Oct. 21, 1930

1,779,399

UNITED STATES PATENT OFFICE

JESS A. SHIVELY, OF AKRON, OHIO, ASSIGNOR TO THE GOODYEAR TIRE & RUBBER COMPANY, OF AKRON, OHIO, A CORPORATION OF OHIO

TIRE-BUILDING APPARATUS

Application filed December 14, 1927. Serial No. 239,943.

This invention relates to tire building apparatus and it has particular relation to an apparatus of the above designated character which shall be especially adapted for applying breaker strips to tire carcasses.

In accordance with present practice, breaker strips are applied under tension to tire carcasses while the latter are mounted upon rotated drums, the speed of travel of the breaker strip material being determined by the peripheral speed of movement of the drums. In the construction of so-called flat-built tires, which are originally assembled in a flattened condition and are subsequently expanded to tire form, a breaker strip applied as above described is subjected to an enormous strain during the tire shaping operation. It is, therefore, herein proposed to apply breaker strips to the carcasses of such tires in a crimped condition in order that the strip will first straighten itself and then stretch during the shaping of the tire, with a resultant decrease in the total amount of stretch imparted to the breaker strip.

One object of this invention is to provide an apparatus for applying a fabric strip to a moving body.

Another object of the invention is to provide an apparatus for applying a breaker strip to a tire carcass in a crimped condition.

A further object of the invention is to provide an apparatus of this character which may be advantageously employed as an attachment for existing forms of tire building machines.

For a better understanding of the invention reference may now be had to the accompanying drawings forming a part of the disclosure, in which;

Figure 1 is a fragmentary side-elevational view illustrating a portion of a tire building machine with a fabric applying apparatus embodying the features of this invention operatively associated therewith; and Figure 2 is a plan view illustrating a portion of the device shown in Figure 1.

In the particular embodiment of the invention illustrated in the accompanying drawings, a frame 11 of a conventional tire building machine rotatably supports a shaft 12, designed to be rotated at a predetermined speed by means of a belt 13 operatively connected to a suitable source of power (not shown). A substantially cylindrical drum 14 secured to the shaft 12 has mounted thereon a tire carcass 15 comprising a plurality of superimposed plies assembled in the usual manner.

The apparatus for appying a breaker strip 16 to the tire carcass 15, broadly considered, comprises a frame 17 integral with, or permanently secured in fixed relation to, the frame 11 of the tire building machine, a carriage 18 movably mounted on the frame 17, mechanism for applying a breaker strip to the tire carcass, indicated generally at 19, and mechanism 21 for supplying and feeding a strip of material to the breaker applying mechanism.

The frame 17 is formed with laterally extending guide flanges 22 designed to fit within correspondingly shaped grooves formed in the carriage member 18 to permit sliding movement of the carriage relative to the frame. A threaded shaft 23, journalled in bearings 24 and 25 disposed centrally between the guide flanges 22 of the frame, is provided on one of its ends with a hand wheel 26 to permit manual rotation of the shaft.

A shaft 27, journalled in suitable bearings 28 secured to opposite sides of the carriage 18, has rigidly secured thereto a depending arm 29 pivotally connected at its lower end to a threaded block 31 designed to coact with the threaded shaft to cause movement of the carriage upon rotation of the shaft. A bell crank lever, including an operating arm 32 and a depending arm 33, is rigidly secured intermediate its ends to one end of the shaft 27. A spring 34 secured at one end to the arm 33 and at its other end to a bracket 35 mounted upon the carriage 18 serves normally to maintain the block 31 in coacting relation with the shaft 23. It is to be noted that downward pressure upon the arm 32 will cause rotation of the shaft 27 whereupon the block 31 will be moved out of engagement with the shaft 23. Upon release of the arm 32 the spring 34 returns the parts to their normal positions with the arm 33 in engagement with a stop 36 secured to the carriage.

A pair of horizontally extending brackets 37 are secured adjacent one end of the carriage 18 and rotatably support a shaft 38 which has mounted centrally thereon a fluted roller 39. As shown, the external surface of the roller 39 is formed with longitudinally disposed and radially extending recesses 41 of V-shape which define spaced teeth 42 designed to engage and carry forward the fabric strip 16. It will be observed that one face 43 of each tooth is disposed in a plane passing through the longitudinal axis of the shaft 38.

An electric motor 44 mounted adjacent the end of the carriage 18 remote from the roller 37 has a sprocket 45 mounted upon its shaft 46 and serves to drive the roller 39 through the agency of a chain 47 trained about the sprocket 45 and a similar sprocket 48 rigidly secured upon the shaft 38. Any suitable means (not shown) may be provided for varying the position of the motor with respect to the roller to properly adjust the tautness of the chain 47.

The strip supplying mechanism 21 preferably includes a pair of vertically extending frame members 49 secured, as indicated at 51, to the carriage 18. A shaft 52 removably journalled between the frame members 49 serves to support a roll 53 of breaker strip material wound in the usual manner with an interposed liner strip 54. A shaft 55 similarly mounted in spaced relation to the shaft 52 carries a roller 50 which serves to guide the strip of material from the roll 53 and functions also as a core upon which the liner 54 is wound as it is removed from the strip 16 by a conventional separating and guiding device diagrammatically shown at 56.

A frame 57 is secured adjacent one of its ends to a shaft 58 which is journalled between the frame members 49. One end of the shaft 58 extends past the frame member 49 and has rigidly secured thereto an arm 61 carrying at its free end a counterbalancing weight 62 for the frame 57.

A pair of guide rollers 63 are rotatably mounted in brackets 64 projecting upwardly from and integral with the body of the member 57. Guide rods 65 are rotatably mounted in the brackets 64 directly above the rollers 63. It will be observed that each rod is provided adjacent its ends with stepped shoulders 66 to aid in guiding the fabric thereunder. A pressure roller 67 is rotatably mounted adjacent the free end of the member 57 and is adapted to exert pressure upon the fluted roller 39 through the interposed strip of fabric 16 to cause the latter to be drawn over the several guide rollers into position for action thereon by the roller 39 to apply it in crimped condition to the tire carcass 15.

The percentage of crimp in the breaker strip applied to the tire carcass 15 is, of course, dependent upon the difference in peripheral speed of movement of the tire carcass and the roller 39. The customary variable speed control (not shown) for the motor may be provided for this purpose.

A bracket 68 extending upwardly from the carriage 18 is provided with a slot 69 for the reception of a pin 71 extending laterally from the member 57 to limit the pivotal movement of the member 57 in one direction. A stop member 72 is provided for engagement by the arm 61 to limit the pivotal movement of the member 57 in the other direction. A stop 73 is also provided at the end of the frame 17 remote from the roller 39 to limit sliding movement of the carriage 18 on the frame.

In practising the invention, a roll 53 of breaker strip material, wound with a liner strip 54 in the usual manner, is mounted upon the shaft 52 and the end of the adhering strip and liner is passed about the roller 55 and between the juxtaposed rollers 74 of the guiding and separating device 56. The liner strip 54 is here separated from the breaker strip material and is caused to wind upon the roll 50 as it is removed from the breaker strip. It is apparent that this roller will be revolved by reason of the passage of the combined breaker strip and liner thereover. From the device 56 the fabric strip is fed between the rollers 63 and the guide rods 65, between the pressure roller 67 and the fluted applying roller 39 and is directed downwardly between the latter roller and the tire carcass 15.

The above operations are to be performed while the carriage is disposed at the limit of its movement to the right, as shown in Fig. 1, and with the member 57 maintained in an elevated condition by its counter-weight 62 and positioned to cause the engagement of the arm 61 with the stop 72. The tire machine and the motor 44 are then operated and the speed of the latter is adjusted to cause the roller 39 to rotate at the desired speed.

The operator then depresses the arm 32 which releases the block 31 from the shaft 23 and permits free movement of the carriage into a position in which the roller 39 is adjacent to the tire carcass 15. The arm 32 is then released and the carriage is accurately positioned by manipulation of the hand wheel 26, after which the member 57 is lowered so that its weight, together with that of the counter-weight 62, becomes effective upon the strip 16 passing between the rollers 67 and the roller 39. It is to be understood that no positive feed of the fabric is permitted until the member 57 is lowered into operative position. The breaker strip 16 is stitched at intervals to the tire carcass 15 by means of the teeth 42 of the roller 39 and, due to the difference in speed of movement of the drum and roller, the strip 16 is applied to the tire carcass in a crimped condition, as indicated at 75.

Although I have illustrated only one form which the invention may assume and have described in detail only a single application thereof, it will be apparent to those skilled in the art that it is not so limited, but that various minor modifications may be made therein without departing from the spirit of the invention or from the scope of the appended claims.

What I claim is:

1. Apparatus for applying fabric to a moving body, including a frame, a carriage movably mounted on the frame, a fluted roller rotatably mounted on the carriage in position to contact with the fabric, means on the carriage for rotating the roller, and means for supplying and guiding fabric to the roller, said fabric supplying and guiding means including a pivoted member carrying a roller for coaction with the fluted roller to feed the fabric.

2. In a fabric applying apparatus an applying roller formed on its exterior surface with longitudinally disposed and radially extending teeth each having a face disposed in a plane passing through the axis of the roller.

3. The combination with a tire building machine including a cylindrical drum and means for rotating the drum at a predetermined speed, of a fluted roller and means for driving the roller in coaction with the drum.

4. The combination with a tire building machine including a cylindrical drum and means for rotating the drum at a predetermined speed, of a fluted roller and means for driving the roller in coaction with the drum at a peripheral speed greater than that of the drum.

5. The combination with a tire building machine including a cylindrical drum and means for rotating the drum at a predetermined speed, of a frame secured adjacent the tire building machine, a carriage slidably mounted on the frame, means for moving the carriage with respect to the tire building machine, a fluted roller rotatably carried by the carriage in position to contact with the drum and means on the carriage for rotating the roller.

6. The combination with a tire building machine including a cylindrical drum and means for rotating the drum at a predetermined speed, of a frame secured adjacent the tire building machine, a carriage slidable on the frame, a fluted roller journalled on the carriage, means for rotating the roller at a peripheral speed greater than that of the drum, and means for supplying and feeding a strip of fabric between the roller and drum.

7. A method of applying fabric to flat-built tire carcasses in crimped condition which comprises simultaneously rotating the carcass and pressing the fabric into engagement with the outer periphery thereof by means of a fluted roller.

8. A method of applying fabric to flat-built tire carcasses in crimped condition which comprises simultaneously rotating the carcass and pressing the fabric into engagement with the outer periphery thereof by means of a fluted roller which is driven at a greater rate of peripheral speed than the tire carcass.

9. An apparatus for constructing flat-built tire bands which comprises means for supporting and rotating the bands, and means for guiding and stitching fabric plies to the carcasses in crimped condition.

10. A machine for constructing flat-built tire bands comprising means for supporting and rotating the bands, a fluted stitcher roller engaging the outer periphery of the bands, and guide mechanism operatively associated with the stitcher roller for directing fabric plies directly between the fluted roller and the tire carcass, whereby to cause the plies to adhere to the carcass in crimped condition.

11. A machine for constructing flat-built tire carcasses comprising means for supporting and rotating the carcasses, a stitcher mechanism associated with said means comprising a carriage mounted for radial movement toward or away from the bands, a fluted crimping roller mounted upon the carriage in position to contact with the carcasses, a presser roller contacting with the stitcher roller and means for guiding strips of fabric between the presser roller and stitcher roller and then directly between the tire carcasses and the stitcher roller.

12. A machine for constructing flat-built tire bands which comprises means for supporting and rotating the bands, stitcher mechanism disposed adjacent to said means, the stitcher mechanism comprising a movable carriage, a fluted stitcher roller mounted upon the carriage in position to contact with the tire carcasses, means for driving the stitcher roller at a peripheral speed greater than that of the tire carcasses, a presser roller engaging the stitcher roller, and means mounted upon the movable carriage for supporting and supplying fabric strips to the stitcher roller.

In witness whereof, I have hereunto signed my name.

Signed at Akron, in the county of Summit, and State of Ohio, this 13th day of December, 1927.

JESS A. SHIVELY.